(12) United States Patent
Lee et al.

(10) Patent No.: US 6,228,291 B1
(45) Date of Patent: May 8, 2001

(54) PROCESS FOR PREPARING CONTROLLED-RELEASED CHITOSAN MICROCAPSULE

(75) Inventors: Jung-min Lee; Choong Kyun Yeom; Chul Ung Kim; Beom Sik Kim; Kwang Joo Kim, all of Daejeon; Sang Bong Oh, Kyungki-do, all of (KR)

(73) Assignee: Korea Research Institute of Chemical Company, Daejeon (KR)

( * ) Notice: Subject to any disclaimer, the term of this patent is extended or adjusted under 35 U.S.C. 154(b) by 0 days.

(21) Appl. No.: 09/342,070

(22) Filed: Jun. 29, 1999

(30) Foreign Application Priority Data

Dec. 17, 1998 (KR) .................................................. 98-56584

(51) Int. Cl.$^7$ .............................. B01J 13/02; B01J 13/04; B05D 7/00
(52) U.S. Cl. .......................... 264/4.1; 264/4.3; 427/213.3; 427/213.31; 427/213.33; 428/402.2; 514/963
(58) Field of Search ................. 264/4.1, 4.3; 427/213.3, 427/213.31, 213.33; 428/402.2; 514/963

(56) References Cited

U.S. PATENT DOCUMENTS 5,840,341 * 11/1998 Watts et al. ........................ 424/499

OTHER PUBLICATIONS

J. Appl. Polym. Sci., 59 (1996) 1795–1801.
J. Appl. Polym. Sci., 60 (1996) 9–20.
J. Appl. Polym. Sci., 41 (1990) 2133–2145.
J. Appl. Polym. Sci., 51 (1994) 1427–1432.
J. Membr Sci., 109 (1996) 257–265.
J. Appl. Polym. Sci., 3 (1991) 2123–2135.
J. Appl. Polym. Sci., 37, (1989) 3385–3398.
J. Membr Sci., 88 (1994) 243–251.

* cited by examiner

*Primary Examiner*—Nathan M. Nutter
(74) *Attorney, Agent, or Firm*—Finnegan, Henderson, Farabow, Garrett & Dunner, L.L.P.

(57) ABSTRACT

The present invention relates to a process for preparing the controlled-release chitosan microcapsule, more specifically to a process for preparing the sustained-release chitosan microcapsule capable of releasing at an appropriate rate for a long time, which is characterized by:

a) Biodegradable chitosan polymer is used for the capsule material;

b) The capsule is kept stable during the release time by the rapid and effective crosslinking reaction between the chitosan polymer and the double crosslinking agent on the surface of tiny particles formed by a new emulsion interface reaction method using a double crosslinking agent of sulfuric acid and glutaraldehyde; and c) The microcapsule which is smaller than several μm s can be easily formed and the capsule is kept stable for a long release time because an insoluble polymer film whose source material is biodegradable is formed after the release.

8 Claims, No Drawings

PROCESS FOR PREPARING CONTROLLED-RELEASED CHITOSAN MICROCAPSULE

BACKGROUND OF THE INVENTION

1. Field of the Invention

The present invention relates to a process for preparing the controlled-release chitosan microcapsule, more specifically to a process for preparing the controlled-release chitosan microcapsule capable of releasing at an appropriate rate for a long time, which is characterized by:

(a) Biodegradable chitosan polymer is used for the capsule material;

(b) The capsule is kept stable during the release time by the rapid and effective crosslinking reaction between the chitosan polymer and the double crosslinking agent on the surface of fine particles formed by a new emulsion interface reaction method using a double crosslinking agent of sulfuric acid and glutaraldehyde; and (c) The microcapsule which is smaller than several $\mu$m s can be easily formed and the capsule is kept stable for a long release time because an insoluble polymer film whose source material is biodegradable is formed after the release.

2. Detailed Description of the Related Arts

From the 1960s, researchers have been carried our for new types of controlled release systems maintaining effective agrochemical concentration for pest control by releasing agrochemicals at a pertinent rate for the best pharmacological effect with the least amount of agrochemicals. This researchers have been focused on solving the problems caused by the fact that the conventional agrochemical spraying does not provide the specificity of the solution-absorption and the transfer process, for example the danger of poisoning caused by the skin contact due to the direct spraying, the waste of agrochemicals by excessive spraying, environmental pollution and soil acidification, and so on.

Among these controlled release system, the microcapsule is the most effective system owing to its diverse applications. Especially in medicine, food and agrochemicals, the use of the microcapsule is increasing rapidly.

Microcapsule is a kind of small container which encloses the contents with film. Mainly, the film is made of synthetic of natural polymer, and controls the release of the contents. The releasing rate of the contents in a microcapsule is mainly determined by the chemical structure, thickness of the capsule film and the size of the microcapsule.

The process for preparing microcapsules is roughly divided into physical coating, phase separation and interfacial polymerization. In physical coating and phase separation, the contents are capsulated by using the conventional polymers. In interfacial polymerization, microcapsule is prepared by dispersing or emulsifying the contents in the immiscible medium and forming the film by the interfacial polymerization of the monomers on the dispersed phase surface. Capsule can also be prepared by the interface reaction [*J. Appl. Polym. Sci.*, 59 (1996) 1795–1801] which is similar to the interface polymerization, wherein the polymer solution containing the contents is inserted into the medium containing a crosslinking agent reactive to the polymer, an insoluble film is formed by the fast crosslinking reaction on the particle surface between the polymer and the crosslinking agent, and a stable capsule is prepared.

Generally, as a hydrophilic polymer has loose structure in moist condition due to the swelling caused by water absorption, the release of the contents is performed easily if is used for the material of the capsule film. Also, as the release rate can be controlled by the crosslinking density of the capsule film, the hydrophilic polymer is suitable for the material of capsule for the agrochemical use. Polyvinyl alcohol [*J. Appl. Polym. Sci.*, 60 (1996) 9–20], polyacrylic acid [*J. Appl. Polym. Sci.*, 41 (1990) 2133–2145], sodium alginate [*J. Appl. Polym. Sci.*, 43 (1991) 2123–2135] and chitosan [*J. Appl. Polym. Sci.*, 51 (1994) 1427–1432] are known as the hydrophilic polymer suitable for the capsule material.

If the capsule material is not decomposed and remains after the contents are completely released, it can be another pollution source. Among the known soluble polymers mentioned above, chitosan is a cationic polymer with relatively good biodegradability. Recently, chitosan is known as improving the soil productivity and having a very positive effect on the life growth.

Preparation of microcapsule by using chitosan is a kind of an interface reaction. Rather than using chitosan only, aqueous solution of sodium alginate, containing target material which is anionic polymer, is dropped into the chitosan solution in the form of regular-size sphere. Then there occurs an ion-complex reaction between the anoinic and the cationic polymer on the interface, and an insoluble film forms on the surface, thereby the capsule is prepared. However, the size of the capsule prepared from this interfacial polymerization method is relatively large—from tens to hundreds of $\mu$ms. The result is the increased capsule loss due to the decrease of the adhesion to the plant surface, when used for agrochemicals. In addition, although the chitosan has advantages for capsule material of agrochemicals as mentioned above, its utilization is limited because it is not easy to make microcapsules made of chitosan only. For this reason, it is necessary to make micro-sized chitosan capsules.

SUMMARY OF THE INVENTION

As a result of researches to prepare microcapsules with size less than several $\mu$m s, a double crosslinking agent system of sulfuric acid and glutaraldehyde was established, by which the crosslinking reaction with chitosan is performed fast and effectively. Also a new emulsion interfacial reaction method combining characteristics of the conventional interfacial polymerization method and interfacial reaction method. By using this method, the biodegradable polymer chitosan solution used for capsule material and the established double crosslink agent solution are emulsified respectively as a form of tiny particles. This includes a fast and effective interfacial reaction on the surface of the particles in polymer solution with relatively small mobility, which enables to form a stable insoluble film fast and effectively.

Accordingly, an objective of the present invention is to provide a process for preparing the stable and micro-size biodegradable sustained-release chitosan microcapsule.

DETAILED DESCRIPTION OF THE PREFERRED EMBODIMENTS

The present invention related to a process for preparing a microcapsule with biodegradable chitosan film which is characterized by comprising the following stages:

(a) A stage wherein emulsion 1 is prepared by inserting an aqueous polymer solution containing 0.3–10 wt % of chitosan and 0.1–2 wt % of acetic acid to an emulsion;

(b) A stage wherein emulsion 2 is prepared by inserting an aqueous crosslinking agent solution containing 0.5–10 volume % of sulfuric acid and 1–50 volume % of aqueous 25% glutaraldehyde solution to an emulsion; and (c) A stage wherein the said emulsion 1 and emulsion 2 are mixed 1:1 under high-speed agitation, and a microcapsule is formed by the emulsion interfacial reaction between chitosan polymer and the crosslinking agent.

The detailed description of the present invention is given as follows.

The present invention relates to a method of capsulizing water-soluble contents using biodegradable chitosan polymer. Biodegradable chitosan polymer solution used for the capsule material and the established double crosslinking agent solution are dispersed as a form of tiny solution particles under high-speed agitation, and emulsified respectively with the aid of the emulsifying agent using a new emulsion interfacial reaction method combining the characteristics of the conventional interfacial polymerization method and interfacial reaction method. Then, a stable insoluble film is formed easily by the fast and effective interfacial reaction on the surface of tiny polymer particles with smaller mobility than the fine emulsifying agent particles due to the contacts of the tiny solution particles in mixing under the high-speed agitation. So, the particles are stabilized and a fine biodegradable capsule is prepared.

Namely, the present invention is characterized by:

(a) The contents and the chitosan polymer solution which is the capsule material enclosing the contents, are dispersed as fine particles in a nonsolvent medium under high-speed agitation, and stabilized with the aid of emulsifying agent; and (b) An insoluble polymer film is formed by the interfacial reaction with a crosslinking agent on the particle surface, and the contents are enclosed by this polymer film.

The object of implementing the crosslinking reaction on the polymer particle surface is to enable the capsulation by the phase separation in the form of polymer film and to maintain the stability of the capsule for a long release time. The requirements of the crosslinking reaction for capsulation are: 1) the crosslinking reaction should be fast, and 2) the crosslinking reaction should occur in aqueous solution. Glutaraldehyde [*J. Membr. Sci.* 109 (1996) 257–265; *J. Membr. Sci.*, 88 (1994) 243] and sulfuric acid [*J. Appl. Polym. Sci.*, 37 (1989) 3385– 3398] are known as the crosslinking agents of chitosan polymer. However, although the reaction between chitosan and glutaraldehyde is relatively fast, it is not so fast to form capsule that the prepared capsule is in the distorted form rather than perfect sphere, or attached to other capsules. But, the chemical covalent bond forms stable capsule film. To the contrary, the reaction between chitosan and sulfuric acid is very fast because the crosslinking is made by ionic crosslinking reaction, but the film structure is very loose and pH-sensitive, because the reaction is implemented in aqueous solution and the bond is ionic, that it is difficult to obtain a stable capsule film. Therefore, in the present invention a double crosslinking agent system was established in which a fast crosslinking reaction and a stable crosslinkage can be obtained by complementing the defects of the two said crosslinking agents by using them together.

In the present invention, the emulsion interfacial reaction method comprises the following processes:

(a) A process of preparing emulsion 1 containing chitosan polymer;

(b) A process of preparing emulsion 2 containing a crosslinking agent;

(c) A process of forming microcapsule by mixing the said emulsion 1 and emulsion 2; and (d) A process of washing and drying the prepared microcapsule.

In addition, the contents enclosed by the chitosan polymer can be any type of aqueous material requiring sustained release, including medicines, agrochemicals and foods. Although the description of the present invention is focused on the capsulation of water, any water-soluble substance can be applied for practical use.

In the preparation of the sustained-release microcapsule of the present invention, firstly, chitosan is mixed with water to form an aqueous solution, and emulsion 1 is prepared by dispersing it as a particle form with the aid of emulsifying agent in an organic solvent. Also, sulfuric acid and glutaraldehyde are with water to form an aqueous solution, and emulsion 2 is prepared by using the same organic solvent and emulsifying agent as used in the preparation of emulsion 1. Here, the particle size of each emulsion depends on the emulsifying agent concentration, the polymer concentration and crosslinking agent concentration of each aqueous solution, the kind of organic solvent, agitating rate, and so on. After the particle formation reaches a steady state as a result of the agitation, when emulsion 2 is inserted into emulsion 1 under agitation, a crosslinking reaction between the polymer and the crosslinking agent on the surface of the aqueous polymer solution particle with low mobility rather than the aqueous crosslinking solution particle with high mobility. At the same time, the polymer inside the particle moves to the surface and the crosslinking reaction continues, thereby a phase separation occurs an insoluble polymer solution with uniform thickness of crosslinkage structure, and consequently a microcapsule is formed. Especially, the reason of inserting the crosslinking agent in an emulsion state is that the capsule size is small and the size distribution of the microcapsule is narrow. After separating the prepared microcapsule from the organic solvent, a perfectly spherical microcapsule is made through washing and lyophilization.

The more detailed description of the preparation process of the present invention is given hereunder.

An aqueous polymer solution is prepared by mixing chitosan and acetic acid with water. The content of the polymer is 0.3–10 wt %, and preferably 0.5–5 wt % and the content of acetic acid is 0.1–2 wt %. If the polymer content is below 0.3 wt %, the solution is so dilute that the polymer film becomes too thin and easily breakable. If it exceeds 10 wt %, the solution is so viscous that the capsule size becomes too large or the capsule is not formed.

After inserting a fixed amount of the polymer solution in an organic solvent containing the emulsifying agent and agitating at the speed of 500–15,000 rpm, the polymer solution is dispersed as a form of particle, and emulsion 1 is prepared by the stabilization due to the emulsifying agent. The emulsifying agent used is SPAN 80(nonionic surfactant of the sorbitol type), and the content of the emulsifying agent is 0.5–10 volume %, and preferably 1–5 volume % to the organic solvent. It the content is below 0.5 volume %, the lack of emulsifying agent makes the particle unstable and the microcapsule is not formed. If it exceeds 10 volume %, the solution becomes so viscous that the microcapsule is hard to be formed. The content of the polymer solution is less than 20 volume %, and preferably 5–10 volume % to the organic solvent. If the content exceeds 20 volume %, the solution becomes so viscous that the capsule is hard to be formed. For the organic solvent, normal hexane and iso-octane are recommendable.

In the preparation of the crosslinking agent solution by mixing sulfuric acid and glutaraldehyde with water, the content of sulfuric acid is 0.5–10 volume %, and preferably 1–5 volume % to the aqueous crosslinking agent solution. 25% glutaraldehyde is used and, its content is 1–50 volume %, and preferably 10–50 volume % to the aqueous crosslinking agent solution.

After adding a fixed amount of the aqueous crosslinking agent solution to the organic solvent containing emulsifying agent, if it is agitated at the high speed of 500–15,000 rpm, the solution becomes dispersed as a form of particles, and the emulsion 2 stabilized by the emulsifying agent is prepared by the particles. The emulsifying agent and organic solvent are the same as those used for preparation of emulsion 1, and so is the content of the emulsifying agent. The content of the aqueous crosslinking agent solution is less than 15 volume %, and preferably 1–10 volume % to the organic solvent.

Emulsion 2 is inserted while agitating emulsion 1. The amount of the inserted emulsion 2 is the same as that of emulsion 1. If the emulsion 2 is inserted, a crosslinking occurs by the contact of the polymer and the crosslinking agent on the surface of less mobile aqueous polymer solution particle rather than the more mobile aqueous crosslinking agent solution particle. At the same time, the polymer inside the particle moves to the surface and the crosslinking continues, and thus a phase separation occurs. Consequently, a microcapsule is formed as an insoluble polymer film with uniform thickness if formed.

After washing the formed microcapsule 4–8 times with petroleum ether, the microcapsule is separated using a centrifuge lyophilized. In this capsulation process, the size of the microcapsule formed is in the range of 0.5–40 µm.

The process for preparing a sustained-release microcapsule of the present invention described above in detail has the following advantages:

(a) The capsulation is rapid;
(b) The process is pro-environmental because water is used as a solvent;
(c) The capsule size and its distribution can be controlled by controlling the agitating speed, amount of emulsifying agent and the concentration of polymer in the aqueous solution; and
(d) The release rate of the contents can be controlled by controlling the crosslinking of the polymer film with the amount of the emulsifying agent.

The following specific examples are intended to be illustrative of the invention and should not be construed as limiting the scope of the present invention as defined by the appended claims.

EXAMPLES 1–3

An aqueous solution was prepared by dissolving 1.5 weight % of acetic acid and respectively 1, 3 and 5 weight % chitosan polymer in water. 10 ml of this solution was inserted into 100 ml isooctane containing 1 volume % of SPAN 80™. Then, emulsion 1 was prepared by agitating it at 500 rpm for 10 mins.

Simultaneously, an aqueous crosslinking agent solution comprising 1 ml of aqueous 25% glutaraldehyde solution and 100 ml of aqueous 2% sulfuric acid solution, was inserted in 100 ml of isooctane containing 1 volume % of SPAN 80. And then, emulsion 2 was prepared by agitating at 500 rpm for 10 mins.

After inserting emulsion 2 in emulsion 1 under agitation, the solution was agitated for 20 more mins. After microcapsule is formed, it was separated and washed with petroleum ether 4–5 times, and the microcapsule was separated with a centrifuge at 5000 rpm and lyophilized in a freeze drier. The shape and size of the obtained microcapsule were observed using an electron microscope, and the result is shown in Table 1.

TABLE 1

|  | Chitosan polymer concentration (wt %) | Capsule size (µm) |
| --- | --- | --- |
| Example 1 | 1 | — |
| Example 2 | 3 | 13 |
| Example 3 | 5 | 39 |

Table 1 shows that the size of the microcapsules prepared in Examples 1–3 increases with the polymer concentration. Some capsules prepared in Example 1 were observed to be broken or distorted. This is because the mechanical strength of the capsule is weak owing to the thin capsule film.

EXAMPLES 4–6

With the same process as in the said Example 1, however with the concentration of the aqueous chitosan polymer solution as 3%, and the concentration of SAPN 80™ as 2, 5 and 10% respectively, the microcapsule was prepared. The shape and size of the prepared microcapsule were observed using an electron microscope, and the result is shown in Table 2.

TABLE 2

|  | Emulsifying agent concentration (volume %) | Capsule size (µm) |
| --- | --- | --- |
| Example 4 | 2 | 10 |
| Example 5 | 5 | 12 |
| Example 6 | 10 | 18 |

Table 2 shows that the size of the prepared microcapsules increases with the emulsifying agent concentration. It is because the size of the formed particles enlarges due to the increase of viscosity of the medium with the increase in the amount of the emulsifying agent. Generally, the prepared particle was in the shape of perfect sphere.

EXAMPLES 7–9

With the same process as in the said Example 2, however with the amount of aqueous 25% glutaraldehyde solution inserted in the aqueous crosslinking agent solution as 0.5, 2 and 5 ml respectively, the microcapsule was prepared. The shape and size of the prepared microcapsule were observed using an electron microscope, and the result is shown in Table 3.

TABLE 3

|  | Amount of aqueous glutaraldehyde solution (ml) | Capsule size (µm) |
| --- | --- | --- |
| Example 7 | 0.5 | 13 |
| Example 8 | 2 | 15 |
| Example 9 | 5 | 14 |

Table 3 shows that the size of the prepared microcapsules does not change much with the change of the composition of the aqueous emulsifying agent solution. But the microcapsules in Example 7 shows some cracks on the surface and loose structure. This is because the capsule film was formed only by ionic bonds due to the shortage of glutaraldehyde which causes stable covalent bond.

EXAMPLES 10–12

With the same process as in the said Example 2, however with the amount of aqueous sulfuric acid solution inserted in the aqueous crosslinking agent solution as 0.5, 3 and 5 ml respectively, the microcapsule was prepared. The shape and size of the prepared microcapsule were observed using an electron microscope, and the result is shown in Table 4.

TABLE 4

| | Amount of aqueous sulfuric acid solution (ml) | Capsule size ($\mu$m) |
| --- | --- | --- |
| Example 10 | 0.5 | 16 |
| Example 11 | 3 | 16 |
| Example 12 | 5 | 15 |

Some microcapsules prepared in Example 10 were not perfectly spherical but distorted. This is because of the effect of the shearing force before the capsule wall is formed due to the slow crosslinking rate caused by the small sulfuric acid amount in the aqueous crosslinking agent solution.

EXAMPLES 13–15

With the same process as in the said Example 2, however with the content of aqueous sulfuric acid solution inserted in the aqueous crosslinking agent solution as 0.5, 5 and 10% respectively, the microcapsule was prepared. The shape and size of the prepared microcapsule were observed using an electron microscope, and the result is shown in Table 5.

TABLE 5

| | Sulfuric acid content in the Aqueous sulfuric acid solution (%) | Capsule size ($\mu$m) |
| --- | --- | --- |
| Example 13 | 0.5 | 14 |
| Example 14 | 5 | 16 |
| Example 15 | 10 | 15 |

Table 5 shows that the size of the prepared microcapsules does not change much with the change of the content of the sulfuric acid in the aqueous sulfuric acid solution. Some microcapsules prepared in Example 13 were not perfectly spherical but distorted. This is because of the effect of the shearing force before the capsule wall is formed due to the slow crosslinking rate caused by the small sulfuric acid amount in the aqueous crosslinking agent solution, as mentioned above.

EXAMPLES 16–18

With the same process as in the said Example 2, however with the agitating rate as 1,000, 5,000 and 15,000 rpm respectively, the microcapsule was prepared. The shape and size of the prepared microcapsule were observed using an electron microscope, and the result is shown in Table 6.

TABLE 6

| | Agitating rate (rpm) | Capsule size ($\mu$m) |
| --- | --- | --- |
| Example 16 | 1,000 | 9 |
| Example 17 | 5,000 | 3 |
| Example 18 | 15,000 | 0.8 |

Table 6 shows that the capsule size changes remarkably with the change of agitating rate. As the agitating rate increased, the size of the prepared capsules decreased rapidly. This is because a violent turbulence occurs with the increase of the agitating rate, and thus the size of the dispersed particles decreases.

EXAMPLES 19–22

With the same process as in the said Example 2, however with the contents of the aqueous glutaraldehyde solution and aqueous sulfuric acid solution in the aqueous crosslinking agent solution as shown in Table 7, and using in emulsion 1 an aqueous solution containing 1 volume % of Hymexazol, an aqueous agrochemical, instead of water, the microcapsule was prepared. 1 g of the prepared microcapsule was dispersed in 2 l of water and the release time was measured. The time spent for 90% of the agrochemical in the capsule to be released was measured, and the result is shown in Table 7.

TABLE 7

| | Aqueous crosslinking agent solution | | |
| --- | --- | --- | --- |
| | Amount of aqueous glutaraldehyde solution (ml) | Amount of aqueous sulfuric acid solution (ml) | Release time (h) |
| Example 19 | 0.5 | 2 | 3 |
| Example 20 | 1 | 0.5 | 7 |
| Example 21 | 2 | 3 | 38 |
| Example 22 | 5 | 5 | 42 |

Table 7 shows that the release time of the prepared microcapsule depends on the each crosslinking agent content of the aqueous crosslinking agent solution. Generally, the release time increases with the content of the crosslinking agent. This is because a stable microcapsule film with high crosslinking density was formed by the sufficient crosslinking reaction. Examples 19 & 20 show that the chemical bond of the glutaraldehyde give the more stable microcapsule than the ionic crosslinking of the sulfuric acid, although the reaction rate is slow.

COMPARATIVE EXAMPLE 1

With the same process as in the said Example 2, however with the content of the aqueous glutaraldehyde solution as 2 ml and that of the aqueous sulfuric acid solution as 0 ml, the microcapsule was prepared. The prepared microcapsules were not perfectly spherical but distorted, as in Example 10 & 13.

COMPARATIVE EXAMPLE 2

With the same process as in the said Example 2, however with the content of the aqueous glutaraldehyde solution as 0 ml and that of the aqueous sulfuric acid solution as 3 ml, the microcapsule was prepared. The prepared microcapsule surface shows cracks or very loose structure, as in Example 7.

Comparing the said Examples with the said Comparative examples, it is concluded that a stable microcapsule can be prepared by the fast and effective crosslinking reaction, when both sulfuric acid and glutaraldehyde are used for the crosslinking agent.

The chitosan microcapsule prepared in the present invention is hydrophilic, stable and small. Also, the preparation process can be simplified and optimized because the crosslinking reaction is performed in aqueous solution. In addition, the size and distribution of the prepared capsules can be controlled, and the release rate of the capsule contents can be controlled by controlling the crosslinking of the polymer film.

The chitosan microcapsule prepared by the preparation process of the present invention, is hydrophilic, highly stable, and the capsule size can be easily controlled, and preparation of the hyperfine microcapsule with nano (nm) size is possible. Especially, if the microcapsule prepared from the present invention is used for agrochemicals, there are many advantages as follows. 1) The poisoning of agrochemicals can be prevented by the capsulation of the agrochemicals. 2) The distribution and excess use of the agrochemicals are reduced by the sustained release of the agrochemicals, and thus the environmental and soil pollution can be prevented. 3) The soil fertility can be improved by the spontaneous decomposition of the biodegradable chitosan polymer after release.

What is claimed is:

1. A process for preparing a controlled-release chitosan microcapsule, comprising:
   (a) preparing an emulsion 1 by inserting an aqueous polymer solution containing from 0.3 to 10 weight percent chitosan and from 0.1 to 2 weight percent of acetic acid in an emulsion;
   (b) preparing an emulsion 2 by inserting an aqueous crosslinking agent solution containing from 0.5 to 10 volume percent of sulfuric acid and from 1 to 50 volume percent of aqueous 25 percent glutaraldehyde solution in an emulsion; and
   (c) mixing said emulsion 1 and said emulsion 2 1:1 to form a microcapsule by the emulsion interfacial reaction between the chitosan polymer and the crosslinking agent.

2. The process for preparing a controlled-release chitosan microcapsule as defined in claim 1, wherein said emulsions 1 and 2 in said steps (a) and (b) contain from 0.5 to 10 volume percent of sorbitan monooleate as an emulsifying agent in an organic solvent.

3. The process for preparing a controlled-release chitosan microcapsule as defined in claim 2, wherein said organic solvent is normal hexane or iso-octane.

4. The process for preparing a controlled-release chitosan microcapsule as defined in claim 1, wherein the inserted amount of said aqueous polymer solution of step (a) ranges from 5 to 10 volume percent to the emulsion.

5. The process for preparing a controlled-release chitosan microcapsule as defined in claim 1 or claim 4, wherein said emulsion 1 is prepared by inserting said aqueous polymer solution of step (a) in the emulsion, agitating it at an agitating rate ranging from 500 to 15,000 rpm, and thereby emulsion dispersing the polymer aqueous solution particle.

6. The process for preparing a controlled-release chitosan microcapsule as defined in claim 1, wherein the inserted amount of said aqueous crosslinking agent solution of step (b) ranges from 1 to 10 volume percent to the emulsion.

7. The process for preparing a controlled-release chitosan microcapsule as defined in claim 1 or claim 6, wherein said emulsion 2 is prepared by inserting said aqueous crosslinking agent solution of step (b) in the emulsion, agitating it at the agitating rate ranging from 500 to 15,000 rpm, and therby emulsion dispersing the polymer aqueous solution particle.

8. The process for preparing a controlled-release chitosan microcapsule as defined in claim 1, wherein the microcapsule formed by said emulsion interface reaction is washed with petroleum ether, separated with a centrifuge and lypohilized.

* * * * *

UNITED STATES PATENT AND TRADEMARK OFFICE
CERTIFICATE OF CORRECTION

PATENT NO. : 6,228,291 B1
DATED : May 8, 2001
INVENTOR(S) : Jung Min Lee et al.

It is certified that error appears in the above-identified patent and that said Letters Patent is hereby corrected as shown below:

Title page,
Item [57], ABSTRACT,
Line 14, "µm s" to read -- µms --.

Item [73], Assignee,
Line 2, "Company" should read -- Technology --

Signed and Sealed this

Twentieth Day of November, 2001

Attest:

*Nicholas P. Godici*

NICHOLAS P. GODICI
*Attesting Officer*  *Acting Director of the United States Patent and Trademark Office*